(12) United States Patent
Angiolillo et al.

(10) Patent No.: US 9,038,104 B2
(45) Date of Patent: *May 19, 2015

(54) SYSTEM AND METHOD FOR PROVIDING AN INTERACTIVE PROGRAM GUIDE FOR PAST, CURRENT, AND FUTURE PROGRAMMING

(71) Applicant: Verizon Patent and Licensing Inc., Arlington, VA (US)

(72) Inventors: Joel Angiolillo, Weston, MA (US); Angel Cordero, Brooklyn, NY (US); Xi Zhang, Newton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,225

(22) Filed: May 23, 2014

(65) Prior Publication Data

US 2014/0259070 A1    Sep. 11, 2014

Related U.S. Application Data

(63) Continuation of application No. 11/771,443, filed on Jun. 29, 2007, now Pat. No. 8,739,213.

(51) Int. Cl.
*H04N 5/445* (2011.01)
*H04N 21/482* (2011.01)
*H04N 5/44* (2011.01)
*H04N 21/431* (2011.01)
*H04N 21/462* (2011.01)
*H04N 21/81* (2011.01)
*H04N 21/84* (2011.01)
*H04N 21/472* (2011.01)
*H04N 21/4722* (2011.01)
*H04N 21/4788* (2011.01)

(52) U.S. Cl.
CPC .......... *H04N 21/482* (2013.01); *H04N 5/4403* (2013.01); *H04N 5/44543* (2013.01); *H04N 2005/4412* (2013.01); *H04N 21/4312* (2013.01); *H04N 21/4622* (2013.01); *H04N 21/47214* (2013.01); *H04N 21/4722* (2013.01); *H04N 21/4788* (2013.01); *H04N 21/4821* (2013.01); *H04N 21/812* (2013.01); *H04N 21/8133* (2013.01); *H04N 21/84* (2013.01)

(58) Field of Classification Search
USPC .................................. 725/39, 40, 44, 50, 52
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,512,963 A | 4/1996 | Mankovitz |

(Continued)

*Primary Examiner* — Nicholas Corbo

(57) ABSTRACT

Embodiments of the present disclosure are directed to a system and method for providing a program guide for past programming comprising receiving a user command to retrieve program data, retrieving the program data from a data source, and outputting, to a display device, the program data in response to receiving the user command. The program data may comprise information relating to previously-aired programming.

20 Claims, 10 Drawing Sheets

(56) References Cited

U.S. PATENT DOCUMENTS

| | | |
|---|---|---|
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,020,930 A | 2/2000 | Legrand |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 7,039,935 B2 | 5/2006 | Knudson et al. |
| 7,069,576 B1 | 6/2006 | Knudson et al. |
| 7,487,529 B1 | 2/2009 | Orlick |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0042923 A1 | 4/2002 | Asmussen et al. |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0240963 A1 | 10/2005 | Preisman et al. |
| 2005/0251824 A1 | 11/2005 | Thomas et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2007/0204308 A1 | 8/2007 | Nicholas et al. |
| 2007/0220575 A1 | 9/2007 | Cooper et al. |
| 2008/0244655 A1 | 10/2008 | Mattila et al. |

US 9,038,104 B2

SYSTEM AND METHOD FOR PROVIDING AN INTERACTIVE PROGRAM GUIDE FOR PAST, CURRENT, AND FUTURE PROGRAMMING

CROSS-REFERENCE TO RELATED APPLICATION

This application is a continuation of U.S. application Ser. No. 11/771,443, filed Jun. 29, 2007, now U.S. Pat. No. 8,739, 213, which is incorporated herein by reference in its entirety.

BACKGROUND INFORMATION

Televisions are extremely popular with consumers. Because of advances in recent technology, electronic on-screen program guides have enabled viewers to quickly find and watch desired programs without bulky paper-bound guides. These electronic program guides (EPGs) allow viewers see what TV programs are playing, or scheduled, on all the channels available to the viewer. As a result, television-watching experience has become much more convenient and pleasurable. However, most EPGs are limited to shows that are currently playing and/or playing in the near future. At best, some EPGs may reveal the dates/times of shows that are playing up to approximately two weeks in the future. Because of laws that prohibit replaying past shows, conventional EPGs do not list TV programs that have previously played in the past. As a result, conventional systems and techniques for searching TV programs on EPGs are inadequate for finding out information on past TV programming.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

A system and process of the present disclosure includes various exemplary embodiments for providing an interactive program guide for past programming. Conventional electronic program guides (EPGs) do not list TV programs that have previously played in the past. Rather, conventional EPGs are restricted to shows/programs that are currently playing and/or playing in the near future. For example, some EPGs may provide the dates/times of future programming up to approximately two weeks. As a result, conventional systems and techniques for searching information on past TV programming are inadequate.

Figure 1:
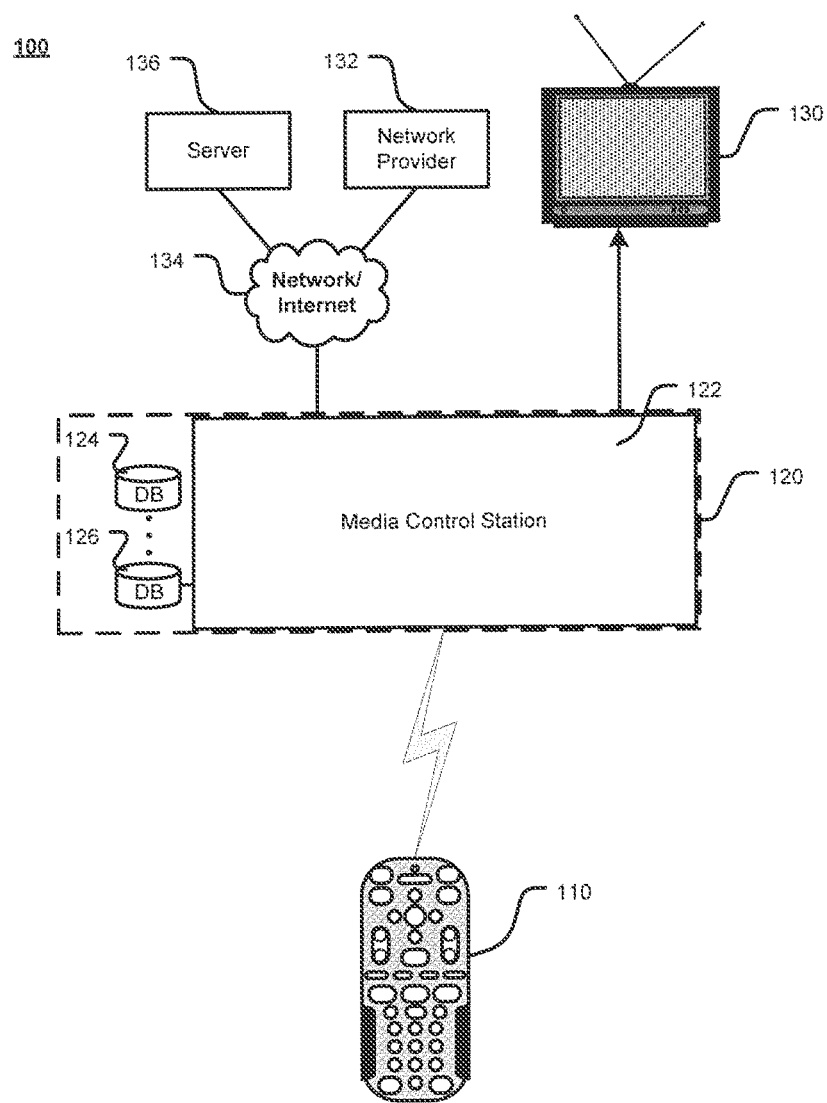
FIG. 1 depicts a block diagram of a system architecture, according to an exemplary embodiment of the present disclosure.

FIG. 1 depicts a block diagram of a system architecture, according to an exemplary embodiment of the present disclosure. System 100 may comprise a remote control device 110, a media box 120, and a display device 130. The display device 130 may be a TV, monitor, or other device capable of displaying media signals. Media box 120 may include a media control station 122 and one or more databases 124, 126. The media control station 122 may include a receiver to receive one or more commands/signals from the remote control device 110, receive one or more media signals (e.g., streaming media, television programs) from one or more network providers (e.g., TV network providers 132) via a network/internet 134 (e.g., cable, satellite), and an output to provide media signals to display at the display device 130. Server 136 may also be connected to the one or more network providers and the media control station 122 via the network/internet 134. Other variations and components may also be provided, such as a viewer interface, additional inputs/outputs, etc.

The remote control device 110 may transmit and/or receive signals to/from the media box 120. Signal transmission by the remote control device 110 may include a variety of wireless signaling pathways, such as infrared, Bluetooth™, local area wireless network (e.g., 802.11 based protocols), and/or other similar signaling applications. Other various embodiments may also be provided.

It should be appreciated by one of ordinary skill in the art that the remote control device 110 may come in a variety of shapes, sizes, textures, and functionalities with an assortment of buttons and/or labels. Additionally, the remote control device 110 may use various technologies (e.g., wired or wireless technologies) to communicate with external devices. Furthermore, the remote control device 110 may include various playback features, alphanumeric entries/buttons, and other similar functions. It should also be appreciated that other devices having alphanumeric and/or similar remote control capabilities may be used as remote control devices as well. These may include desktop computers, laptops, game controllers, mobile communication devices, such as personal digital assistants (PDAs), mobile phones, smart phones, as well as other devices that may transmit and/or receive signals to/from the media box 120.

Databases 124, 126 may store relevant information received from one or more network providers 132. Exemplary database information may include network provider information, advertisement categories, advertisers, advertised product/service, TV program channel numbers, TV program channel names, program listings, program schedules for each of the programs, future and past programming information, ratings, and/or other information provided by a TV network provider 132. Although shown as two separate databases, it should be appreciated that the contents of these databases may be combined into fewer or greater numbers of databases and may be stored on one or more data storage systems and/or servers. Furthermore, the databases 124, 126 may be local, remote, or a combination thereof to the media box 120. Additionally, the databases 124, 126 may also store relevant information for personalized subscriber services. These may include user/viewer channel preferences, preferred TV programs/channels, preferred TV viewing times, and other preferred or customized information. Such information may be useful in providing additional customizations for enhanced TV-viewing experience. Other variations may also be provided.

Server 136 may include one or more processors (not shown) for recording and storing data and/or information from the one or more network providers 132. The data and/or information may be stored and indexed in one or more databases (not shown) by the one or more processors of the Server 136. In this example, the stored data and/or information may include past, current, and future TV program data. In one embodiment, the program data may be received concurrently with the TV program from one or more network provider 132. In another embodiment, the program data may be received separately from a network provider 132, a third party, another program data source, or a combination thereof. In another embodiment, the stored data and/or information may include TV advertisements and corresponding advertisement data provided by TV network providers. In one embodiment, TV advertisements and corresponding advertisement data may be transmitted along with TV programming and guide information. As a result, the server 136 may utilize processor logic to identify the desired data and/or information to be recorded and stored. In another embodiment, the server 136 may also include additional processing logic to sort and index the one or more recorded and stored program data by at least one of the following: program information, broadcast (or rebroadcast) information, reviews, social network information, event/show statistics, category, advertisement information, initial broadcast time, ratings, popularity, closed-captioning information, etc. Storing and indexing may be achieved by parsing the program data, which may typically be transmitted as searchable metadata.

In addition to recording, storing, and indexing the program data, the server 136 may also record and store other data and/or information. In addition to program data, these may include a variety of streaming media, such as TV programs (and corresponding program data), TV advertisements (and corresponding advertisement data), music files (and corresponding music data), and other similar media.

Although the server 136 is depicted as one server, it should be appreciated that the contents of the server 136 may be combined into fewer or greater numbers of servers (or server-like devices) and may be connected to one or more data storage systems. Furthermore, the server 136 may be local, remote, or a combination thereof to the media box 120. The server 136 may also store additional data and/or information relevant for personalized functionalities. For example, the server 136 may store data including rebroadcasting rights, rebroadcasting information, ratings, past and future broadcasting information, etc. This data may be used for customizing services provided by or to a TV network provider 132. Additionally, the server 136 may also customize or personalize subscriber services by recording, storing, and/or indexing additional data/information related to past, current, and future TV programming (or other media) by one or more additional subscriber preferences. Other various embodiments may also be provided.

By recording, storing, and/or indexing past, current, and future programming data, as discussed above, many details about various TV programming may be efficiently navigated. Not only does this provide an effective and improved technique for searching details of various programs/shows, it also provides users the ability to access program data for past (or expired) programming, which may not otherwise be provided by conventional EPGs. A program may be considered a past (or expired) program if the user scrolls back to a program that aired before the current time or current listing of programs on the program guide. Because of this, overall TV-watching experience may be further enhanced. Accordingly, embodiments of the present disclosure may expand the limited number of techniques for searching and viewing past, current, and future program data associated with one or more shows/programs using various program guide menus and options.

Figure 2A:
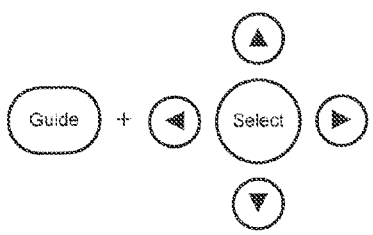
FIG. 2A depicts remote control keys for initiating an interactive program guide and program information menu, according to an exemplary embodiment of the present disclosure.
Figure 2B:
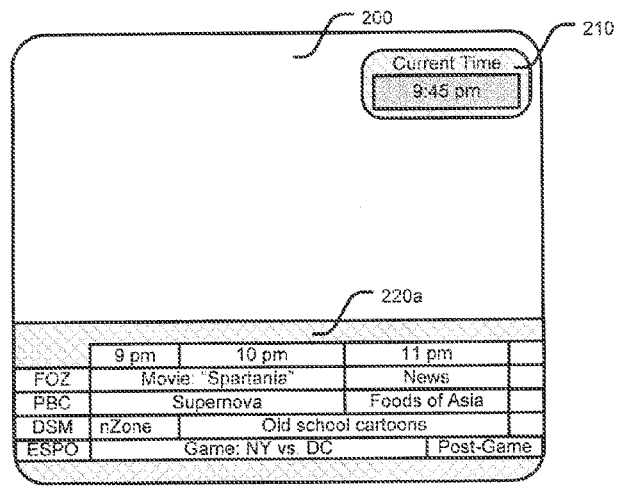
FIG. 2B-2C depict screenshots of an interactive program guide and program information page, according to an exemplary embodiment of the present disclosure.
Figure 2C:
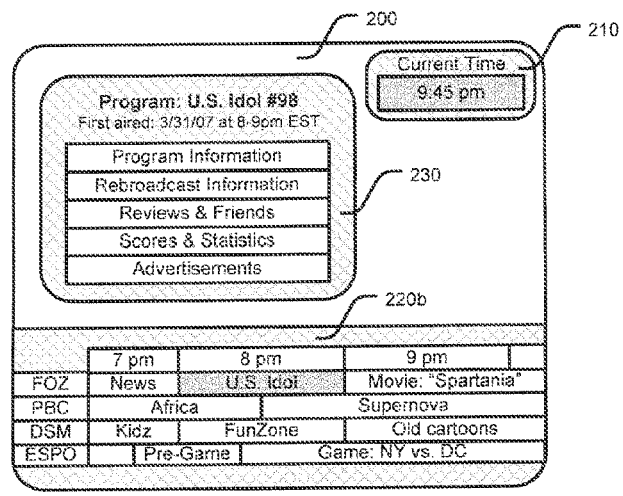

FIG. 2A depicts remote control keys for initiating an interactive program guide and program information menu, according to an exemplary embodiment of the present disclosure. FIG. 2B-2C depict screenshots of an interactive program guide and program information menu, according to an exemplary embodiment of the present disclosure. A user may initiate navigation of TV programs and/or TV program data by sending a user command from the remote control device 110 to the media box 120, specifically the media control station 122. Once the media box 120 receives and processes the user command, the media control station 122 may output, at the display device 130, an interactive program guide (IPG) including a variety of user options for the user to specify the TV program and/or program data to view.

In one embodiment, as depicted in FIG. 2A, a user may press a Guide button (or other similar button or buttons) on the remote control device 110 to send a user command to the media box 120. In response to receiving the user command, the media box 120 may provide a current time indicator 210 and an interactive program guide (IPG) 220*a* to be displayed at the display device 130. In one embodiment, for example, the interactive program guide (IPG) 220*a* may be displayed over a current screen or video broadcast 200, as depicted in FIG. 2B. In this example, the interactive program guide (IPG) 220*a* may provide a variety of programs/shows (and corresponding program data) for the user to navigate, select, and view. In order to search for TV programs and/or program data, a user may use the remote control device 110 to navigate and select entries. For example, the user may navigate the interactive program guide 220*a* by using the arrows and Select button, as depicted in FIG. 2A. Referring back to FIG. 2B, the interactive program guide (IPG) 220*a* may provide at least one of past, current, and future programming, and a variety of other viewing functions and/or customizable options. In this example, the user may use the arrow keys on the remote control device 110 to navigate and highlight a current or future program. For a current program, the user may select a program for immediate viewing or may open up a program information menu. For a future program, the user may not yet have access to play the show, but if the user has a personal video recorder (PVR), also called a digital video recorder (DVR), or other similar device, the show may be selected and set for future recording and/or viewing. In another embodiment, if the user does not have a PVR or DVR, the user may set future program/show to prompt the user to switch over to the selected future program/show at the appropriate time. Even though the show/program may not yet be viewed, the user may open up a program information menu for the future show to view information about the program as long as the information is provided by a network provider or other data source.

Unlike conventional EPGs, the interactive program guide (IPG) 220*b*, as depicted in FIG. 2C, may also include information on previously-aired programs. For example, a user may scroll back in the interactive program guide (IPG) 220*b* and select a previously aired show. In this example, the current time may be 9:45 PM, but the user may scroll back to a show that aired from 8:00 PM-9:00 PM, as depicted in FIG. 2C. If the user did not previously record the show using a PVR/DVR, for example, the show may not typically be rebroadcasted for viewing due to legal implications (unless the network provider initiates a rebroadcast or re-run). Therefore, the interactive program guide 220*b*, rather than playing the previously-played show, as with a current program, or setting the show for recording, as with a future show, may simply provide a program information menu 230 upon selection. In other words, once an expired program is highlighted, the user may press the Select button on the remote control device 110. In response to receiving and processing this selection command from the remote control device 110, the media control station 122 may provide a program information menu 230 to be overlayed on the screen 200. Alternatively, in another embodiment, the program information menu 230 may be selected without pressing the Select button but by allowing the arrow indicator to sit at the highlighted entry for a predetermined period of time, e.g., one second. In yet another embodiment, the program data may be selected by pressing a Menu button on the remote control device 110. As a result, the user may use the remote control device 110 to select a previously-aired show/program list in the interactive program guide (IPG) 220*b* and pull up program data on that particular show/program. Having various ways to open up a program information menu 230 may be beneficial not just for previously-aired programs, but also for distinguishing other actions/functions for current and future programs/shows.

Referring back to FIG. 2C, the program information menu 230 may be interactive and may provide a variety of categories for a user to choose from. These may include program information, broadcast (or rebroadcast) information, reviews, social network information, scores and/or statistics of events within a program, and advertisements and advertisement information. Other program data may also be considered and provided. In one embodiment, the program title, episode number, and/or first airing information may also be displayed at the program information menu 230 for convenient user viewing.

It should be appreciated that any of the menus/indicators 210, 220, 230 may be of varying sizes, shapes, colors, fonts, or other stylistic features, and may be positioned at various locations on the video screen 200. In one embodiment, for example, the program information menu 230 may take up the entire screen 200. In another embodiment, the program information menu 230 may be smaller, overlayed, or put in the corner of the video broadcast 200, e.g. picture-in-picture (PIP). The menus/indicators 210, 220, 230 may also be personalized or customized to the preferences of different users. Other various embodiments may also be provided.

Additionally, while the program menu data 230 above is described in reference to previously-aired programs/shows on the interactive program guide (IPG) 220*b*, it should be appreciated by one skilled in the art that the functions and features of the program information menu may apply similarly to current and future programming as well. For example, a program information menu 230 may be accessed for current and/or future programs as well. Although the program information menu of current and/or future shows may not necessarily include rebroadcast information, it should be appreciated that such information may also be included. Other variations may also be provided.

Figure 3A:
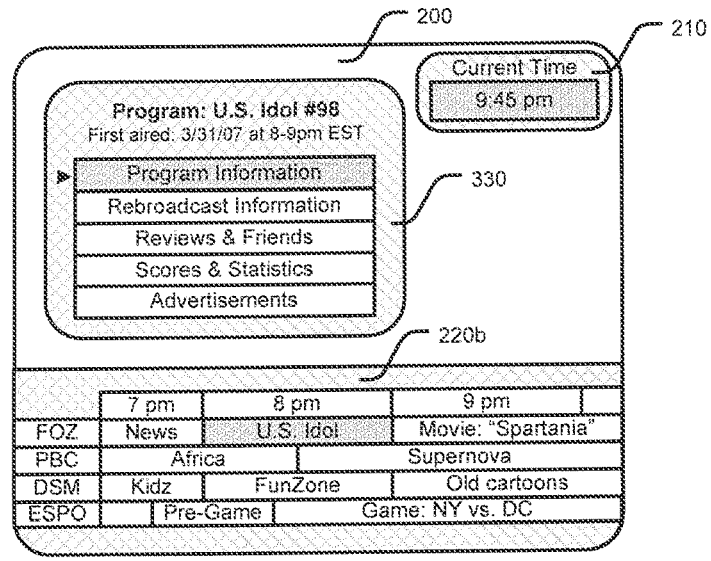
FIGS. 3A-3B depict screenshots of an interactive program guide and program information page, according to an exemplary embodiment of the present disclosure.
Figure 3B:
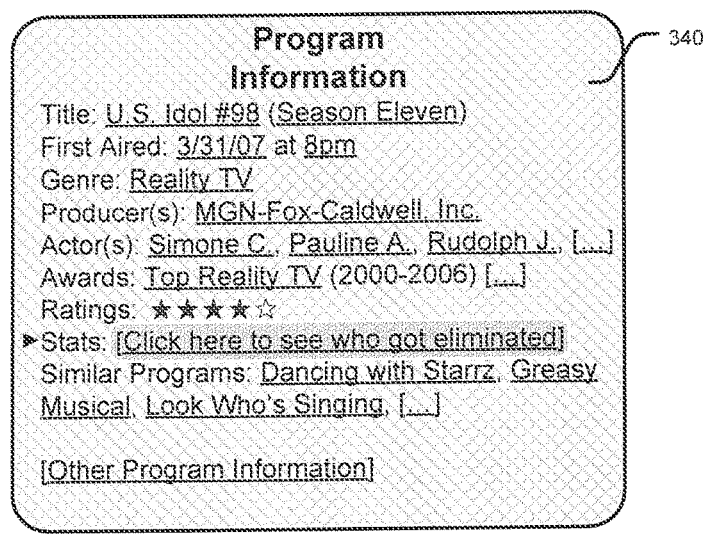

FIGS. 3A-3B depict screenshots of an interactive program guide and program information page, according to an exemplary embodiment of the present disclosure. As discussed above, a user may initiate navigation of TV programs and/or TV program data by sending a user command from the remote control device 110 to the media box 120, specifically the media control station 122. Once the media box 120 receives and processes the user command, the media control station 122 may output, at the display device 130, an interactive program guide (IPG) including a variety of user options for the user to specify the TV program and/or program data to view.

In one embodiment, as depicted in FIG. 3A, a user may interact with the program guide 220*b* and select from a variety of shows/programs from a variety of channels from a variety of TV network providers. In this example, the user may select "U.S. Idol" from among various shows, programs, movies, sports events, etc. By manipulating the arrows on the remote control device 110 and by pressing the Select button (or other similar buttons) or by waiting for a predetermined amount of time (e.g., 1-2 seconds), the remote control device 110 may send a program data command to the media box 120. Once a receiver at the media box 120 receives this program data command, a program information menu 330 for the selected program (in this case, U.S. Idol) may be displayed over the video broadcast 200, e.g., via picture-in-picture (PIP).

Accordingly, the user may then interact with the program information menu 330 and select from a variety of aforementioned categories, as depicted in FIG. 3A. In this example, the user may select a "Program Information" option by manipulating the arrows on the remote control device 110 and by pressing the Select button (or other similar button) to send the program information command to the media box 120. In response to receiving the program information command, the program data associated with the "Program Information" option may be retrieved by the media box 120. In one embodiment, the program data may be retrieved local databases 124, 126. In another embodiment, the program data may be retrieved from via the network/Internet 134 (or cable, satellite, etc.) from databases at the server 136, the network provider 132, or other third party program data provider. Once the program data corresponding to Program Information is retrieved, the media box 120 may output the program data to the display device 130 to be displayed for the user to view, e.g., via picture-in-picture (PIP) or full screen.

FIG. 3B depicts a program information page 340, e.g., a "Program Information" screen, for the user to view the program data associated with the selected Program Information option from the program information menu 330. The "Program Information" screen 340 may display a variety of information for the user to view. The information may include, but are not limited to, the title of the show or program, when the show or program was first aired, what type or genre of TV programming it is, the producers of the show or program, the actors/actresses involved in the show or program, ratings, awards, statistics (or summary of the show or program), similar programs, and other program information.

For example, as depicted in FIG. 3B, the "Program Information" screen 340 may indicate that the show the user is inquiring about is entitled "U.S. Idol #98." In this case, "#98" may represent the episode number and the screen may also provide the season number (e.g., "season eleven"). Moreover, the screen 340 also may also indicate that U.S. Idol was first aired on "Mar. 31, 2007 at 8:00 PM," is of the "Reality TV" genre, and produced by "MGN-Fox-Caldwell, Inc." The "Program Information" screen 340 may also indicate several characters (e.g., actors/actresses, hosts/hostesses, judges/participants, and other figures) on U.S. Idol #98. In this case, "Simone C., Pauline A., and Rudolph J" are listed. Other characters may also be selected. For example, the user may view additional characters of U.S. Idol #98 by highlighting and selecting the "[ ... ]" option. This option may direct the user to one or more additional screens/menus of other characters involved in the show. The screen 340 may also indicate that U.S. Idol has received "Top Reality TV" honors from years 2000 to 2006 and that this show/episode has received a four star rating (e.g., out of five). Additionally, the user may also access the statistics (or summary of the show) by highlighting and selecting the information subset. For instance, a person on the U.S. Idol #98 may have been eliminated and the user may click on the "Stats" option to pull up this information as well. Other similar TV programs to U.S. Idol may also be accessed by the user. In this case, the "Program Information" screen 340 may indicate that there are at least three shows similar to U.S. Idol, such as "Dancing with the Starrz," "Greasy Musical," and "Look Who's Singing." Other program information may also be provided on the Program Information screen 340 as well.

It should be appreciated the information listed in the program information page 340 may not limited to the categories described above. Furthermore, the information available to the user, as listed in the page 340, may not be limited to what is presented in the screen. For instance, it should be appreciated that while the "[ ... ]" option is discussed above in reference to the Actor(s) component of the page 340, the "[ ... ]" option may functional similarly for other information subsets as well. Other ways to access additional information may also be provided. Furthermore, in another embodiment, many of the information components in screen 340 may be underlined to indicate that the user may interact with the screen 340 (e.g., by highlighting and selecting via the remote control device 110) to pull up additional screens/menus for more detail information on that particular information component/subset. Other various embodiments may also be considered.

Figure 4A:
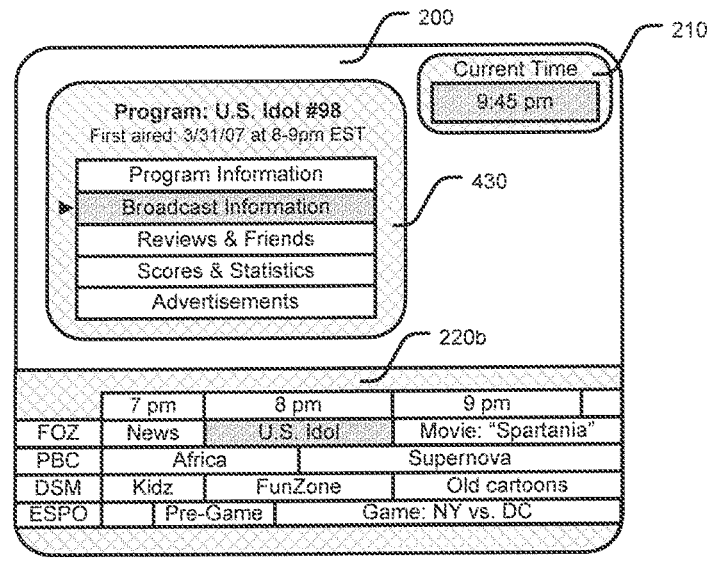
FIGS. 4A-4B depict screenshots of an interactive program guide and program information page, according to an exemplary embodiment of the present disclosure.
Figure 4B:
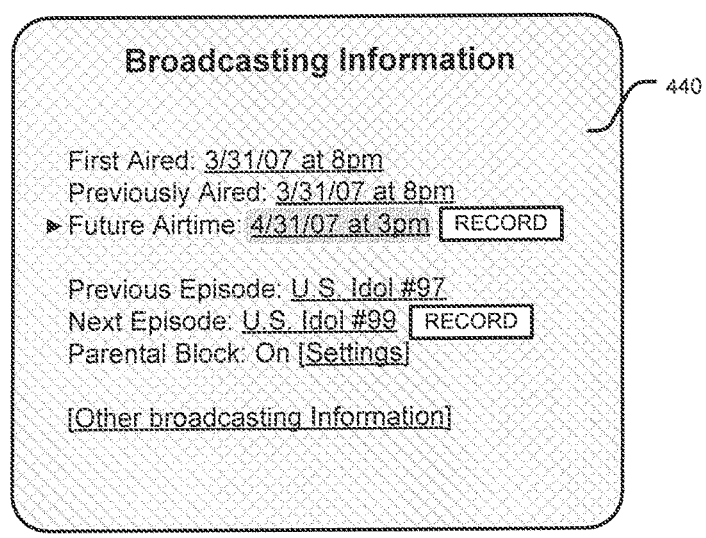

FIGS. 4A-4B depict screenshots of an interactive program guide and program information page, according to an exemplary embodiment of the present disclosure. As discussed above, a user may initiate navigation of TV programs and/or TV program data by sending a user command from the remote control device 110 to the media box 120, specifically the media control station 122. In response to receiving and processing the user command, the media control station 122 may output, at the display device 130, an interactive program guide (IPG) including a variety of user options for the user to specify the TV program and/or program data to view.

In one embodiment, as depicted in FIG. 4A, a user may then interact with the program information menu 430 and select from a variety of aforementioned categories. In this example, the user may select a "Broadcast Information" option by manipulating the arrows on the remote control device 110 and by pressing the Select button (or other similar button) to send the broadcast information command to the media box 120. In response to receiving the broadcast information command, the program data associated with the "Broadcast Information" option may be retrieved by the media box 120. The program data may be retrieved locally from databases 124, 126 or remotely via the network/Internet 134 (or cable, satellite, etc.) from databases at the server 136, the network provider 132, or other third party program data provider. Once the program data corresponding to Broadcast Information is retrieved, the media box 120 may output the program data to the display device 130 to be displayed for the user to view, e.g., via picture-in-picture (PIP) or full screen.

FIG. 4B depicts a Broadcast Information screen 440 for the user to view the program data associated with the selected Broadcast Information option from the program information menu 430, in accordance with an exemplary embodiment of the present disclosure. The Broadcast Information screen 440 may include a variety of information for the user to view. These may include when the show or program was first aired, when the show or program was previously aired (if not the same as the first airing), any future air times, next sequential episodes, previous episodes, episode/program blocking features, recording features, and other broadcasting information.

For example, as depicted in FIG. 4B, the program information page 440, e.g., "Broadcast Information" screen, may indicate that U.S. Idol was first aired on "Mar. 31, 2007 at 8:00 PM," which in this case, was also the previously aired date/time as well. The "Broadcast Information" screen 440 may also indicate one or more future air times, e.g., Apr. 31, 2007 at 3:00 PM. In this example, the screen 440 may also provide a Record option for recording the next airing, for example, on a personal video recorder (PVR) or digital video recorder (DVR). In addition, the "Broadcast Information" screen 440 may also indicate that the next sequential episode of U.S. Idol is #99 and that the previous episode was #97. In one embodiment, the next sequential episode may also include a Record option for recording, for example, on a personal video recorder (PVR) or digital video recorder (DVR), when it is schedule to air. A blocking functionality option (e.g., parental blocking) may also be provided at the "Broadcast Information" screen 440 in the case where, for example, parents do not desire their children or other family members from watching U.S. Idol. In this example, the parental block is designated as "ON," as depicted in FIG. 4B. In order to change this setting, the user may interact with the screen 440 and select "[Settings]" to pull up addition screens/menus to adjust, change, or just to view the settings. For instance, these screen/menus may include various security features, e.g., passwords. Other various embodiments may also be provided. Other broadcasting information may also be provided at the "Broadcast Information" screen 440 as well.

It should be appreciated the information listed in the screenshot 440 may not limited to the categories described above. Furthermore, the information available to the user, as listed in the screenshot 440, may not be limited to what is presented in the screen. It should further be appreciated that many of the information components in screenshot 440 may be underlined to indicate that the user may interact with the screenshot 440 (e.g., by highlighting and selecting via the remote control device 110) to pull up additional screens/menus for more detail information on that particular information component/subset. Other various embodiments may also be considered.

Figure 5A:
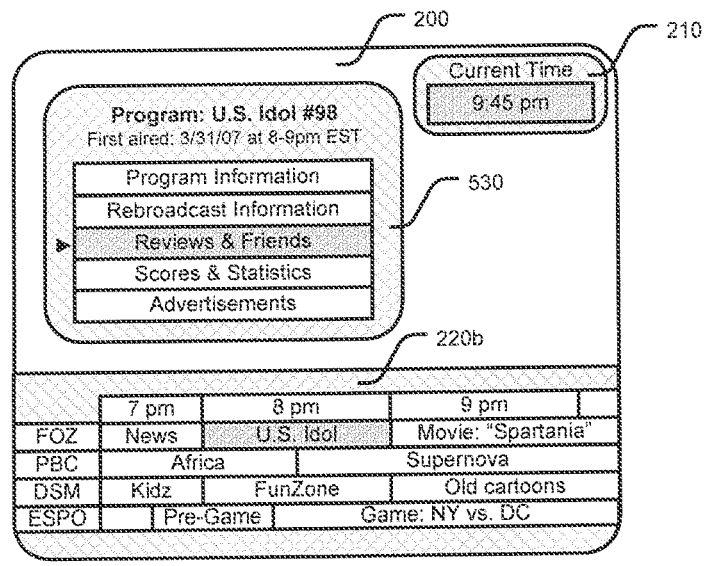
FIGS. 5A-5B depict screenshots of an interactive program guide and program information page, according to an exemplary embodiment of the present disclosure.
Figure 5B:
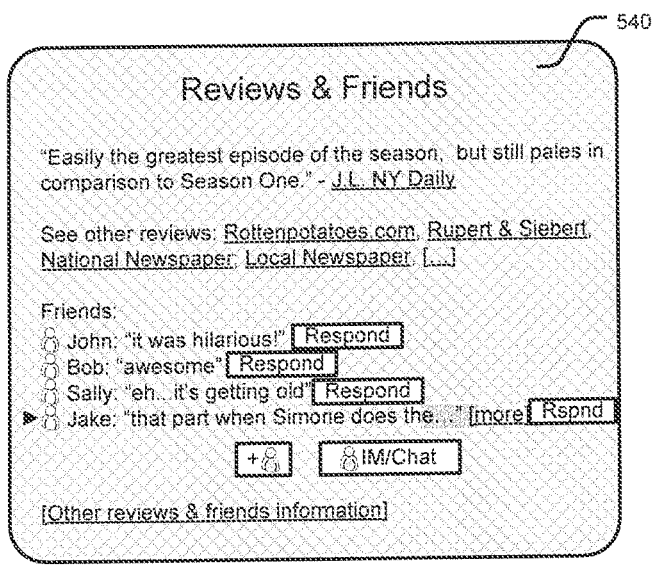

FIGS. 5A-5B depict screenshots of an interactive program guide and program information page, according to an exemplary embodiment of the present disclosure. The Reviews & Friends information screenshot 540 may include a variety of information for the user to view. These may include reviews of the show/program (e.g., episode, movie, sporting event, etc.) by national critics, local critics, national/local newspapers and sources, as well as from "friends" in a virtual social network. Other reviews and friends information may also be provided.

Specifically in the example depicted in FIG. 4B, the program information page 540, e.g., "Reviews & Friends" screenshot, may indicate that U.S. Idol received several reviews. For instance, "J. L." from the "NY Daily" may recite, "Easily the greatest episode of the season, but still pales in comparison to Season One." In the event there was more to this review, the user may be able to interact, using a remote control device, with what is displayed on the screenshot 540 and read on. The "Reviews & Friends" screenshot 540 may also include links or options to read reviews from other source, such as, but not limited to, "Rottenpotatoes.com," "Rupert & Siebert," a national newspaper, a local newspaper, etc.

In one embodiment, reviews from "Friends" in a virtual social network may also be displayed. In this example, the media box 120 of the user may connect via the network/Internet 134 to the server 136, which may in turn connect to other users via their media boxes. As a result, a social network may be established where information, such as reviews of TV programs, etc., may be shared with other parties (e.g., "Friends"). Accordingly, the user may have one or more friends in the network who have posted comments for others to read. In this case, the user has four "Friends" who each posted reviews/comments about U.S. Idol episode #98. Specifically, "John" may state that "it was hilarious!," "Bob" may state that it was "awesome," "Sally" may disagree with John and Bob and state that the show was "eh . . . it's getting old," and "Jake" may describe the portion of the episode that he enjoyed, e.g., "that part when Simone does the . . . ." In one embodiment, each review/comment entry by each Friend may be accompanies by an image, such as a downloadable, shareable picture, e.g., a logo, digital photograph, etc. Thus, the media box 120 may function similar to that of a computer and share information or it may be connected to one or more computers to perform these functions. In another embodiment, each review/comment entry by each "Friend" may also include a Respond option so that the user may respond to comment with the "Friends" about the episode about anything else. Social interactivity may be further enhanced by an Instant Messaging or Chat feature, as depicted in FIG. 5B. "Friends" may be added or added by the discretion of the user. Furthermore, other messaging, social interactivity features and functionalities may be implemented provided on this "Reviews & Friends" screenshot 540 as well. Other review and & friends information may also be provided.

It should be appreciated the information listed in the screenshot 540 may not be limited to the categories described above. Furthermore, the information available to the user, as listed in the screenshot 540, may not be limited to what is presented in the screen. For example, because of the social networking capability provided by the media box 120 and the server 136, the user may also be able to detect what shows/programs the user's "Friends" have previously watched, have set to record/view, etc. In the event these conditions/settings are mutually agreed upon by the parties, the media box 120 and the server 136 may accommodate, manage, and/or host such desired the features and functionalities via the network/Internet 134. Other various embodiments may also be provided.

It should further be appreciated that many of the information components in screenshot 540 may be underlined to indicate that the user may interact with the media control station 122 in response to what is being displayed on the screenshot 540 (e.g., by highlighting and selecting via the remote control device 110) to pull up additional screens/menus for more detail information on that particular information component/subset. For example, in this case, the user may want to read the funny "part" that "Jake" was commenting about. The user may highlight the "[more]" option and pull up another screen/menu or extend the current screen to read on. Other various embodiments may also be considered.

While the features and functionalities are discussed with respect to the "Reviews & Friends" program information page 540, as depicted in FIG. 5B, it should be appreciated that such features and functionalities may be similarly applied to each of the aforementioned program data, such as program information, broadcast information, reviews & friends, scores & statistics, and other program data. Furthermore, while the program menu page 540 above is described in reference to previously-aired programs/shows on the interactive program guide (IPG) 220*b*, it should be appreciated by one skilled in the art that the functions and features of the program information menu may apply similarly to current and future programming as well. For example, even though a show/program may not yet be viewed, the user may open up a program information page for the future show to view information about the program as long as the information is provided by a network provider or other data source. As a result, a program information page 540 may be accessed for current and/or future programs as well. Other variations may also be provided.

Figure 6A:
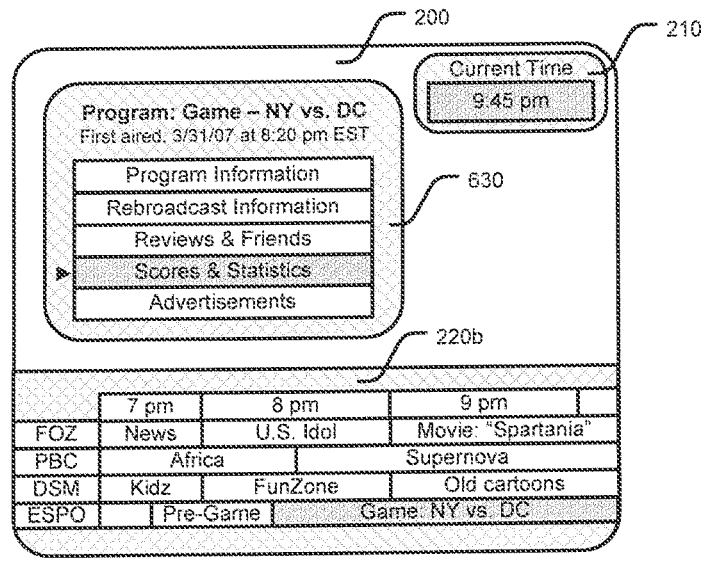
FIGS. 6A-6B depict screenshots of an interactive program guide and program information page, according to an exemplary embodiment of the present disclosure.
Figure 6B:
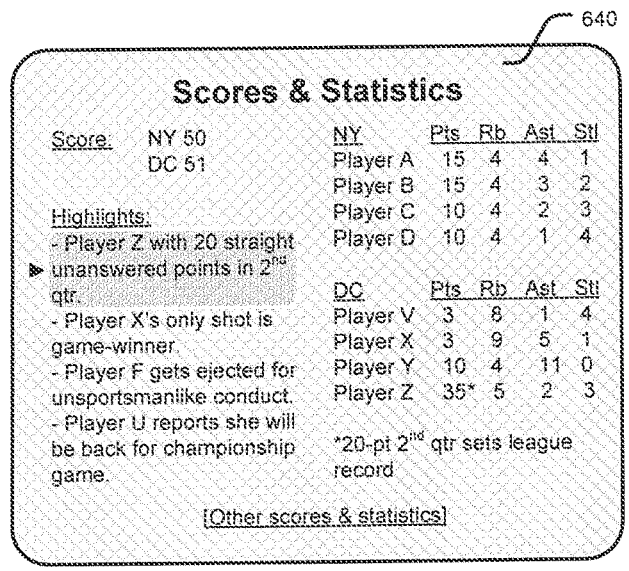

FIGS. 6A-6B depict screenshots of an interactive program guide and program information page, according to an exemplary embodiment of the present disclosure. As discussed above, a user may initiate navigation of TV programs and/or TV program data by sending a user command from the remote control device 110 to the media box 120, specifically the media control station 122. Once the media box 120 receives and processes the user command, the media control station 122 may output, at the display device 130, an interactive program guide (IPG) including a variety of user options for the user to specify the TV program and/or program data to view.

In one embodiment, as depicted in FIG. 6A, a user may interact with the program guide 220*b* and select from a variety of shows/programs from a variety of channels from a variety of TV network providers. In this example, the user may select "Game: NY vs. DC" from among various shows, programs, and movies, etc. By manipulating the arrows on the remote control device 110 and by pressing the Select button (or other similar button) or by waiting for a predetermined amount of time (e.g., 1-2 seconds), the remote control device 110 may send a program data command to the media box 120. Once a receiver at the media box 120 receives this program data command, a program information menu 630 for the selected program (in this case, U.S. Idol) may be displayed over the video broadcast 200, e.g., via picture-in-picture (PIP).

Accordingly, the user may then interact with the program information menu 630 and select from a variety of aforementioned categories, as depicted in FIG. 3A. In this example, the user may select a "Scores & Statistics" option by manipulating the arrows on the remote control device 110 and by pressing the Select button (or other similar button) to send the program information command to the media box 120. Once a receiver at the media box 120 receives the scores & statistics information command, the program data associated with the "Scores & Statistics" option may be retrieved. The program data may be retrieved from locally from databases 124, 126 or remotely via the network/Internet 134 (or cable, satellite, etc.) from databases at the server 136, the network provider 132, or other third party program data provider. Once the program data corresponding to Scores & Statistics is retrieved, the media box 120 may output the program data to the display device 130 to be displayed for the user to view, e.g., via picture-in-picture (PIP) or full screen.

FIG. 6B depicts a program information page 640, e.g., a "Scores & Statistics" screenshot, for the user to view the program data associated with the selected "Scores & Statistics" option from the program information menu 630. The "Scores & Statistics" screenshot 640 may include a variety of information for the user to view. These may include the information relating to a sporting event (or the result of reality TV show, e.g., who won or who got eliminated), such as the score, individual player statistics (e.g., points, rebounds, assists, steals, etc.) for each team, highlights, and other scores and statistics or other related information.

For example, as depicted in FIG. 6B, the "Scores & Statistics" screenshot 640 may indicate that the sporting event was a close game since "DC" had "51" points and "NY" had "50" points, beating them by only one point. The screenshot 640 may also indicate that "Player Z" broke a record by scoring 20 straight points in the second quarter and that he was the team leader in the points scored in the individual player statistics. Information regarding the other players may also be provided on the screenshot 640. In one embodiment, in the event a user recorded the program on a PVR/DVR, the user may be able to select and watch the event or the specific portions highlighted by the "Scores & Statistics" screenshot 640. Highlights may be available in the event the user recorded the event. In another embodiment, highlights are available in the event the network provider (or other third party) may have rebroadcasting rights to replay the portions of the event. Other various embodiments may also be provided.

It should be appreciated that many of the information components in screenshot 640 may be underlined or highlightable to indicate that the user may interact with the screenshot 640 (e.g., by highlighting and selecting via the remote control device 110) to pull up additional screens/menus for more detail information on that particular information component/subset. For example, in this case, the user may want to read the in greater detail about "Player Z with 20 straight unanswered points . . . ." The user may highlight the corresponding selection and pull up another screen/menu or extend the current screen to read on. Other various embodiments may also be considered.

Figure 7A:
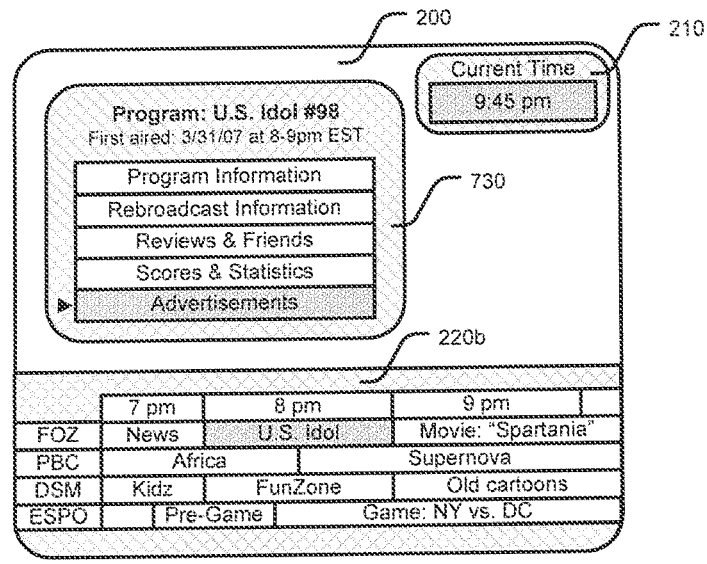
FIGS. 7A-7B depict screenshots of an interactive program guide and program information page, according to an exemplary embodiment of the present disclosure.
Figure 7B:
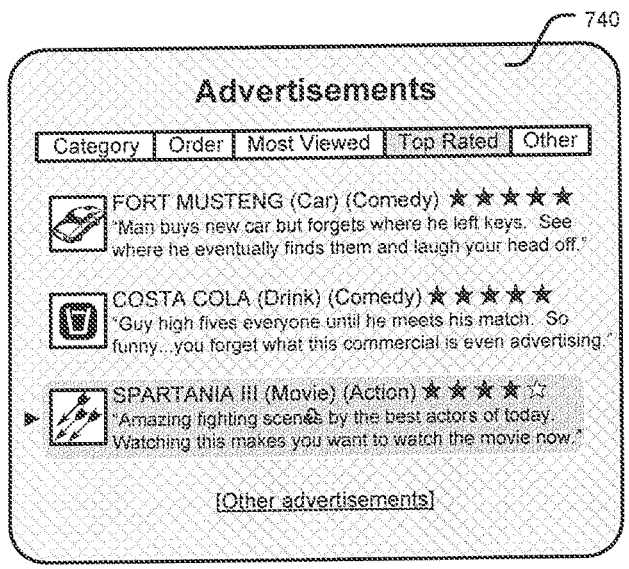

FIGS. 7A-7B depict screenshots of an interactive program guide and program information page, according to an exemplary embodiment of the present disclosure. As discussed above, a user may initiate navigation of TV programs and/or TV program data by sending a user command from the remote control device 110 to the media box 120, specifically the media control station 122. Once the media box 120 receives and processes the user command, the media control station 122 may output, at the display device 130, an interactive program guide (IPG) including a variety of user options for the user to specify the TV program and/or program data to view.

In one embodiment, as depicted in FIG. 7A, a user may then interact with the program information menu 730 and select from a variety of aforementioned categories. Referring back to the selected U.S. Idol example (described earlier), the user may select an "Advertisements" option by manipulating the arrows on the remote control device 110 and by pressing the Select button (or other similar button) to send the program information command to the media box 120. In response to receiving the advertisements information command, the program data associated with the "Advertisements" option may be retrieved by the media box 120. Once the program data corresponding to "Advertisements" is retrieved, the media box 120 may output the program data to the display device 130 to be displayed for the user to view, e.g., via picture-in-picture (PIP) or full screen. The features and functionalities of the "Advertisements" option may operate, store, and retrieve data/information similar to the embodiments described in co-pending U.S. application Ser. No. 11/693,338, filed on Mar. 29, 2007, entitled "System and Method for Providing a Directory of Advertisements," which is hereby incorporated by reference in its entirety.

FIG. 7B depicts a program information page 740, e.g., an "Advertisements" screenshot, for the user to view the advertisement and/or the corresponding advertisement data/information the program information menu 730. It should be appreciated that while information is provided to the user at the "Advertisements" screenshot 740, advertisements themselves may not be limited by the legal restrictions similar to that on TV programs. As a result, the server 136 may record, store, and index one or more advertisements for the user to view. In addition to the advertisement itself, the "Advertisements" screenshot 740 may provide a variety of sorting options for the user to view the advertisements.

In the example depicted in FIG. 7B, the "Advertisements" screenshot 740 may provide a list of advertisements that aired during the program, e.g., the previously-selected U.S. Idol #98. For example, a "Fort Musteng" car commercial, a "Costa Cola" beverage advertisement, and a "Spartania III" movie preview may have aired and may therefore be provided on the screenshot 740. As discussed above, the user may select from a variety of indexing categories so that the "Advertisements" screenshot 740 may sort the advertisements in a desired sequence. These categories may include advertisement category (e.g., by product, advertiser, producer, etc.), air time sequence (e.g., first-to-last or last-to-first), most viewed, top rated (e.g., based on feedback, reviews, rankings, etc.), and other categories, such as a searching function. In this example, the "Top Rated" option was selected, and therefore the order of the commercials/advertisements on the screenshot 740 may be listed from highest rated to the lowest rated. In one embodiment, each advertisements may include a summary, a review, a rating, category, genre, and other related advertisement information to be displayed on the screenshot 740 as well. In another embodiment, an image, such as an category icon, a digital picture, etc., may be provided in the advertisement listing to add style and make it easier for a user to locate/view the advertisement list.

Features from the social network discussed above with reference to the "Reviews & Friends" option, may also be similarly implemented with the "Advertisement" program information page 740 as well. For instance, advertisement reviews may be provided from a variety of sources, such as a national newspaper, a local newspaper, and/or "Friends." In one embodiment, reviews from "Friends" in a virtual social network may also be displayed on the screenshot 740. Here, the media box 120 of a user may connect via the network/Internet 134 (or cable, satellite, etc.) to the server 136, which may in turn be connect to other users via their respective media boxes. As a result, a social network may be established where information, such as reviews of TV advertisements, etc., may be shared with other parties (e.g., "Friends"). Accordingly, the user may have one or more friends in the network who have posted comments/reviews about these specific advertisements for others to read. Furthermore, other messaging, social interactivity features and functionalities, as provided for the "Friends" network, may also be similarly applied on this "Advertisement" screenshot 740 as well. Other various advertisement information embodiments may also be provided.

It should be appreciated that many of the information components in screenshot 740 may be underlined or highlightable to indicate that the user may interact with the screenshot 740 (e.g., by highlighting and selecting via the remote control device 110) to pull up additional screens/menus for more detailed information on that particular information component/subset. For example, in this case, the user may want to read more than what was presented on the screenshot 740 about "Spartania III" before playing the commercial. The user may perform this function by selecting the advertisement with an alternative button, such as the Menu button or other similar key. Other various embodiments may also be considered.

While the indexing/sorting/searching features and functionalities are discussed with respect to the "Advertisements" screenshot 740, as depicted in FIG. 7B, it should be appreciated that such features and functionalities may be similarly applied to each of the aforementioned program data, such as program information, broadcast information, reviews & friends, scores & statistics, and other program data.

It should be appreciated that any of the screens 340, 440, 540, 640, 740 may be of varying sizes, shapes, colors, fonts, or other stylistic features, and may be positioned at various locations on the video screen 300, 400, 500, 600, 700. In one embodiment, for example, the screenshots 340, 440, 540, 640, 740 may take up the entire screen 300, 400, 500, 600, 700. In another embodiment, the program information menu 230 may be smaller, overlayed, or put in the corner of the video broadcast 300, 400, 500, 600, 700, e.g. picture-in-picture (PIP). The screenshots 340, 440, 540, 640, 740 may also be personalized or customized to the preferences of different users. Other various embodiments may also be provided.

Figure 8:
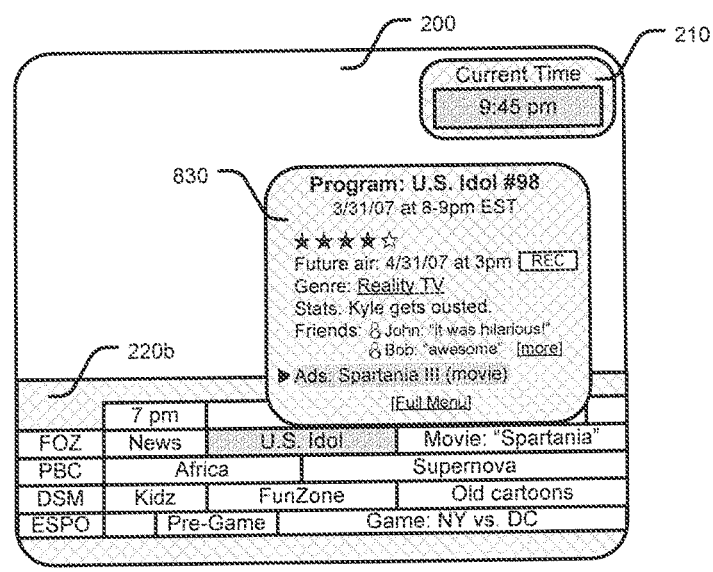
FIG. 8 depicts screenshots of an interactive program guide and customized program information page, according to an exemplary embodiment of the present disclosure.

FIG. 8 depicts screenshots of an interactive program guide and customized program information page, according to an exemplary embodiment of the present disclosure. As discussed above, a user may initiate navigation of TV programs and/or TV program data by sending a user command from the remote control device 110 to the media box 120, specifically the media control station 122. Once the media box 120 receives and processes the user command, the media control station 122 may output, at the display device 130, an interactive program guide (IPG) including a variety of user options for the user to specify the TV program and/or program data to view.

In one embodiment, as depicted in FIG. 8, a user may interact with the program guide 220b and select from a variety of shows/programs from a variety of channels from a variety of TV network providers. In this example, the user may highlight "U.S. Idol" from among various shows, programs, movies, sports events, etc. By manipulating the arrows on the remote control device 110 and by waiting for a predetermined amount of time (e.g., 1-2 seconds) after the desired show is highlighted, the remote control device 110 may send a program data command to the media box 120. Once a receiver at the media box 120 receives this program data command, a program information menu 830 for the selected program (in this case, U.S. Idol) may be displayed over the video broadcast 200, e.g., via picture-in-picture (PIP). Alternatively, in another embodiment, the user may use the arrows and press the Menu button (or other similar button) to activate and view the program information menu 830.

Unlike the program information pages described above, the program information page in this example may be a customized program information page 830. For example, the user may set a number of predetermined components from each of the program data categories to be displayed in a single customized program information page 830 so that the user does not have to view on different screens 340, 440, 540, 640, 740, all the user's desired program data. As illustrated in FIG. 8, the user may set the program information page 830 to display the title of the show/program, the first airing of the show/program, the ratings of the show/episode, the next time the show/program is schedule to air again (and the corresponding PVR/DVR record setting feature), the genre, the stats or summary of the show/program, "friends" reviews/comments, and a list of advertisements. As a result, in the event the user knows that these are the features frequently searched, a customized program information page 830 having each of these components for the user to view in a single customized program information page 830 may increase efficiency and the user's overall TV-watching experience. In one embodiment, the customized program information page 830 may also include an option to enlarge the page 830 (or window), for example, so as to incorporate more components that may not have fit in the smaller page or to include more detail regarding the components already shown in the small page. Other various customizations may also be provided.

Figure 9:
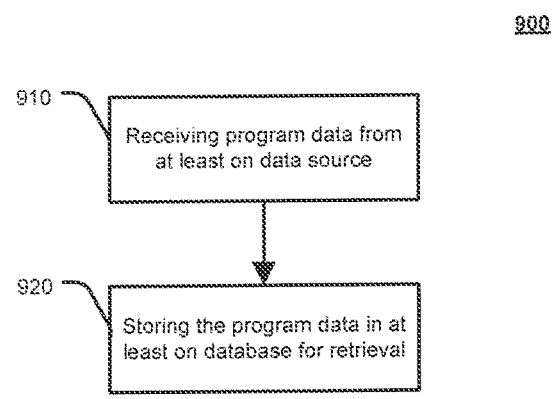
FIG. 9 depicts a flowchart, according to an exemplary embodiment of the present disclosure.

FIG. 9 depicts a flowchart, according to an exemplary embodiment of the present disclosure. At block 910, a signal, e.g., a program signal, may be received. For example, the server 136 may receive a signal from a network provider 132 (or other third party source), wherein the signal includes program data. In one embodiment, the network provider 132 (or third party source) may provide program data media, such as music, images, etc., in addition to program data. In yet another embodiment, the one or more advertisement data may include searchable metadata as provided by the network provider 132 or other third party source. Other variations may also be provided.

At block 520, the program data may be stored. For example, the server 136 may store the program data in one or more databases for retrieval. The one or more databases may be local, remote, or a combination thereof to the media box 120. The program data may include information relating to past, current, or future programming. Additionally, the information relating to past, current, or future programming comprises at least one of program information, rebroadcast information, reviews, advertisement information, social network information, and statistics. The social network information may comprise information from third parties belonging to at least one network. The statistics may comprise event information from an event that occurred in the past programming. The information relating to past programming comprises information relating to current or future programming that have expired. Other various embodiment may also be provided.

Figure 10:
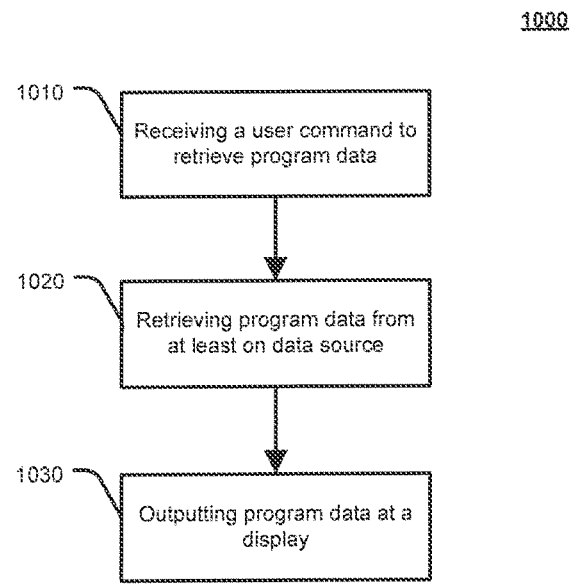
FIG. 10 depicts a flowchart, according to an exemplary embodiment of the present disclosure.

FIG. 10 depicts an illustrative flowchart, according to an exemplary embodiment of the present disclosure. At block 1010, a signal may be received. For example, the media box 120 may receive a signal from the remote control device 110 to retrieve program data.

At block 1020, program data may be retrieved. For example, the media box 120 may retrieve program data from a data source. The data source may include at least one database, a network provider 132, and other third party source. The program data may comprise searchable metadata. The program data may comprise information relating to past programming. The information relating to past programming may comprise at least one of program information, rebroadcast information, reviews, advertisement information, social network information, and statistics. The social network information may comprise information from third parties belonging to at least one network. The statistics may comprise event information from an event that occurred in the past programming. The information relating to past programming may comprise information relating to current or future programming that have expired.

At block 1030, the program data may be outputted. For example, the media box 120 may output, at a display device 130, the program data in response to receiving the user command. The program data may be displayed as an interactive program menu. The program data may be displayed as a customized interactive program menu. Other various embodiment may also be provided.

While the features and functionalities of the program information menus and program information pages are primarily discussed with respect to the embodiments above, it should be appreciated that the features and functionalities of one embodiment may be similarly applied to at least each of the other embodiments. Furthermore, while the program information menus and pages above are described primarily in reference to previously-aired programs/shows on the interactive program guide (IPG) 220b, it should be appreciated by one skilled in the art that the functions and features of the program information menu may apply similarly to current and future programming as well, where applicable. For example, even though a show/program may not yet be viewed, the user may open up a program information page for the future show to view information about the program as long as the information is provided by a network provider or other data source. Other variations may also be provided.

It should be appreciated by one skilled in the art that any device capable of transmitting alphanumeric commands may function as a remote control device for the purposes of the embodiments described above. For example, a mobile phone with SMS-capability may send an alphabetic channel-changing SMS to a media box 120, which may include a variety of alphabetical command readers to search/retrieve advertisements from an Server 136. Accordingly, desktops, laptops, and/or mobile communications devices may also serve to provide remote control functionalities. Other various embodiments may also be provided.

While the embodiments described above may be directed to a media box 120, specifically the media control station 122, or an Server 136, to process the interactive program guide features discussed above, it should be appreciated to one of ordinary skill in the art that a remote control device 110, a display device 130, and/or other component may include processing capabilities to perform the features described above as well. Additionally, it should be appreciated that one or more of these devices and/or components may be combined (e.g., a TV and a network card) to perform the interactive program guide features described above. Other variations may also be provided.

Furthermore, although the embodiments described above are directed toward television programs and advertisements, it may be readily appreciated that one or ordinary skill in the art may apply the features and functionalities discussed above to any video, audio, or web based component, such as computers, communications devices, PVRs or DVRs, multimedia websites/servers, DVDs players, VCRs, CD players, MP3s players, etc. Other various embodiments may also be contemplated.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
    displaying to a user a menu listing current, future, and previously-aired programming;
    receiving, at an electronic receiver, a user command to retrieve program data, the program data comprising new facts relating to the previously-aired programming that were unavailable when the previously-aired programming was originally broadcast;
    in response to receiving the user command retrieving, by a processor, the program data from a data source; and
    outputting, to a display device, the retrieved program data.

2. The method of claim 1, wherein the data source comprises at least one of a database, a network provider, and a third party source.

3. The method of claim 1, wherein the menu lists the current, future, and previously-aired programming chronologically and sequentially by channel.

4. The method of claim 1, wherein the program data further comprises rebroadcast information for at least one of the current, future, and previously-aired programming.

5. The method of claim 1, wherein the program data is displayed as a customized interactive program menu.

6. The method of claim 1, wherein the program data further comprises at least one of program information, reviews, advertisement information, social network information, and statistics.

7. The method of claim 6, wherein the statistics comprise event information from an event that occurred in the previously-aired programming.

8. The method of claim 1, wherein the event was a sporting event and the statistics comprise a final score of the sporting event.

9. The method of claim 1, wherein the menu displays a current time, thereby allowing the user to distinguish between the current, future, and previously-aired programming.

10. The method of claim 1, wherein the retrieved program data is output in a submenu of the menu such that the user cannot see the new facts until bringing up the submenu.

11. A non-transitory computer readable media comprising code to perform the acts of the method of claim 1.

12. A system, comprising:
    a receiver configured to receive a user command to display program data in an interactive program menu that lists current, future, and previously-aired programming, wherein the program data comprises information for the previously-aired programming, the information comprising new facts that were unavailable when the previously-aired programming was originally broadcast;
    a processor configured to retrieve the program data from a data source in response to receiving the user command; and
    an output configured to output, to a display device, the retrieved program data.

13. A method, comprising:
    receiving program data from at least one data source, wherein the program data comprises new facts relating to previously-aired programming that was unavailable when the previously-aired programming was originally broadcast;
    storing the program data in at least one database for retrieval and display upon user command;
    displaying to a user a menu listing current, future, and the previously-aired programming;
    receiving from the user, at an electronic receiver, a user command to display the program data; and outputting, to a display device, the program data in response to receiving the user command.

14. The method of claim 13, wherein the menu lists the current, future, and previously-aired programming chronologically and sequentially by channel.

15. The method of claim 13, wherein the program data further comprises at least one of program information, rebroadcast information, reviews, advertisement information, social network information, scores, and statistics.

16. The method of claim 15, wherein the statistics comprise event information from an event that occurred in the previously-aired programming.

17. The method of claim 15, wherein the menu displays a current time, thereby allowing the user to distinguish between the current, future, and previously-aired programming.

18. The method of claim 13, further comprising receiving, at the electronic receiver, a user command to retrieve program data for the current programming or the future programming.

19. A non-transitory computer readable media comprising code to perform the acts of the method of claim 13.

20. A system, comprising:
a receiver configured to receive program data from at least one data source, wherein the program data comprises new facts relating to previously-aired programming and that was unavailable when the previously-aired programming was originally broadcast;
at least one database configured to store the program data for retrieval and display upon user command; and
a media control station configured to:
display an interactive program guide listing current, future, and the previously-aired programming;
receive a user command to display the program data; and
output, to a display device, the program data in response to receiving the user command.

* * * * *